Sept. 17, 1940.  F M. CLARK  2,214,878

ELECTROLYTIC CAPACITOR

Original Filed April 14, 1936

Inventor:
Frank M. Clark,
by Harry E. Dunham
His Attorney.

Patented Sept. 17, 1940

2,214,878

UNITED STATES PATENT OFFICE 2,214,878

ELECTROLYTIC CAPACITOR

Frank M. Clark, Pittsfield, Mass., assignor to General Electric Company, a corporation of New York Original application April 14, 1936, Serial No. 74,310. Divided and this application November 18, 1938, Serial No. 241,223

2 Claims. (Cl. 175—315)

The present invention, which is a division of application Serial No. 74,310, filed April 14, 1936, relates to sheet material of film-forming metal, such as aluminum.

Heretofore armatures for capacitors (or condensers) of the electrolytic type have been prepared by subjecting film-forming metal to suitable electrolytic treatment to form a current-blocking film. Such filmed sheet metal together with suitable spacers, ordinarily sheets of paper, have been assembled in capacitor form and impregnated with a suitable liquid.

As a consequence of my present invention, a metal structure is provided whereby the cubical volume or bulk of electrolytic capacitors can be reduced, their manufacture simplified and their efficiency improved by forming on one or both of the armatures a composite film which renders the presence of a separate spacer unnecessary.

In accordance with my invention aluminum foil, (or other sheet material suitable for use as armature element), has formed upon its surface a composite coating made up of a current-blocking film and an electro-permeable resin film, both films being the result of electrolytic action. The resin film, which may consist of shellac, is first deposited on the metal base and the current-blocking film is formed under the resin film. The novel features of my invention will be set forth in greater particularity by the appended claims.

Figure 1:
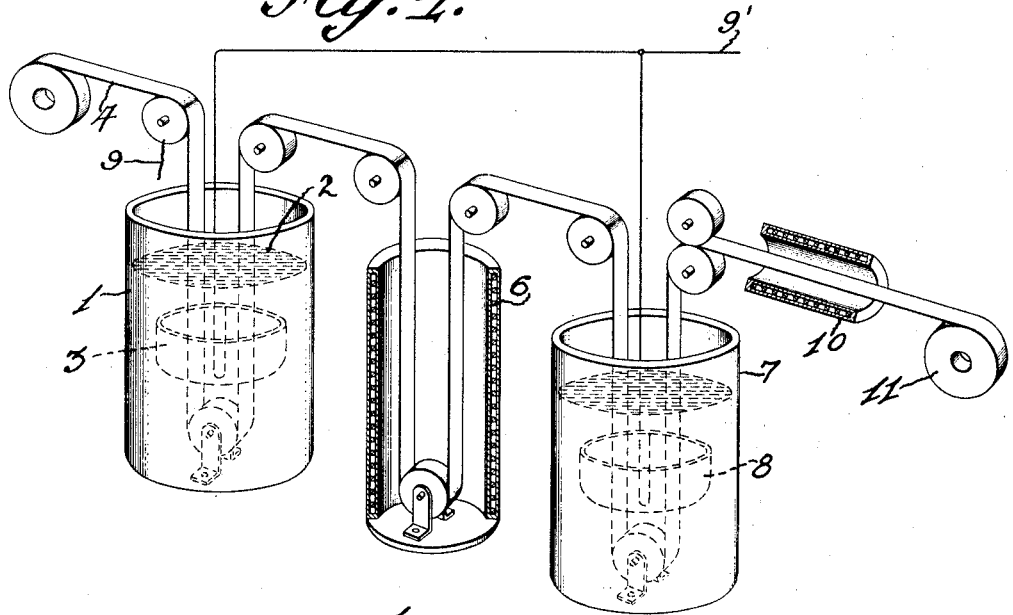
Figure 2:
Figure 3:
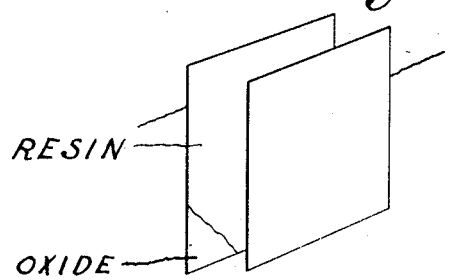

In the accompanying drawing, Fig. 1 is a diagram indicating the sequence of steps of the process feature of my invention. Fig. 2 illustrates an armature element and Fig. 3 illustrates conventionally a capacitor embodying my invention.

As indicated by Fig. 1, an elongated foil of film-forming metal, such as aluminum, tantalum, magnesium, or suitable alloy is conducted into an electrolyte consisting of a suitable resin-depositing electrolyte, and by the application of a suitable current a coating of resin is electro-deposited thereon. Such electrolyte may be made by dispersing an alkali-soluble resin in water containing a suitable alkali. I may employ shellac (which is of insect origin) or a tree resin, such as rosin, mastic, anime, dammar, sandarac, or dragon's blood or a fossil resin, such as amber or kauri. Various alkaline solutions may be used, such, for example, as an hydroxide or borate or carbonate of sodium, potassium or ammonium, or mixtures of such alkali compounds.

For example, about 100 grams of shellac may be introduced into about 500 cubic centimeters of water which contains dissolved about 5 grams of alkaline material of the kind above specified, preferably sodium carbonate. The material used should be free from chlorides. The mixture is boiled for about an hour, resulting in complete solution of the shellac. It is probable that such "solution" involves chemical reaction involving hydrolysis of the shellac. When the alkaline material is represented by a borate (such as the tetraborate of sodium or ammonium) then a few per cent (about 10 cubic centimeters) of concentrated ammonium hydroxide is added, preferably after boiling has been carried out for about an hour. Boiling is continued thereafter for about fifteen minutes to secure complete solution and the elimination of excess ammonia. The solution thus obtained is ready for use in capacitors.

In some cases a plasticizer or flexibilizer may be added such as a soap or rubber latex, as described in U. S. Patent No. 2,145,710, patented January 31, 1939, which is assigned to the same assignee of the present application.

As shown in Fig. 1 of the drawing, an elongated strip of aluminum foil is treated in successive steps to produce the composite coating. The foil 4 is first conducted through a receptacle 1 containing a solution of resin 2 as, for example, the shellac solution above described, which may be maintained at a temperature of 35 to 45° C. The container is provided with a cathode 3 and suitable direct current is impressed between the foil 4 acting as anode and the cathode 3. A potential of 160 volts is suitable for the deposition of a shellac film on the foil when passing through the electrolyte solution 2 at such rate that the foil is immersed in the shellac solution for about one minute although the exact immersion time is not critical. For example, the foil may move at a rate of four feet per minute with an immersion of three feet in the solution, thereby giving an immersion time of three-quarters of a minute in the solution.

The foil continues in its progress from the container 1 to an oven 6 in which it is baked at about 100 to 200° C. from about one to two minutes. The electrical conductivity of the film is not lost by this short bake. It then passes into a container 7 through an aqueous electrolyte which is suitable for producing a current-blocking film of oxygenous material on the aluminum. Such an electrolyte may consist of a solution of borax and boric acid, as described in U. S. Patent No. 2,022,500 issued to Clark and Koenig. The electrolyte may be maintained at about 95° C. The voltage applied will vary with the voltage to be applied on the completed capacitor. I prefer to use a voltage equal to or slightly greater than the maximum direct current or peak alternating current voltage to which the capacitor will be normally subjected. Thus, for 110 volts alternating current application, a direct current voltage of about 160 volts may be employed for the electrolytic treatment. The aluminum foil as before acts as anode, a separate electrode 8 being employed as cathode. Electrolyzing current is supplied by the conductor 9, 9'. The resin film being applied to the foil prior to the electrolytic treatment, the electrolysis occurs under the resin film resulting in the current-blocking film of oxide of aluminum or whatever other metal may be employed as though the resin film were not present.

The coated foil is dried by passing through a second oven 10 which is maintained at a temperature of about 100 to 200° C., heat being applied again for about one to two minutes. Too high a temperature or too long a period of baking will result in the film becoming impermeable to electrolyte and passage of current. The coated and formed product is finally coiled upon a reel 11 and is ready for use.

Two coated layers of foil may be placed in juxtaposition to form the elements of a capacitor as shown conventionally in Fig. 3 without the interposition of any porous spacer, it being understood that the capacitor elements may be assembled in any desired way, that is, either by stacking or by coiling, as well understood. The voids in the capacitor assembly may be impregnated or filled with any suitable electrolyte. A number of available electrolyte compositions are described in my prior Patent No. 2,145,710, of January 31, 1939, and in the above-mentioned Patent No. 2,022,500. Other known electrolyte compositions may be employed. After impregnation the capacitor assembly is placed in a receptacle which is provided with suitable terminals as well understood.

Capacitors so prepared for 110 volt alternating current circuits show power factors of less than 10 per cent and capacity of approximately one microfarad for 8½ square inches of active foil area. In respect to these and other characteristics, including length of operating life and reliability, capacitors embodying the present invention compare favorably with capacitors containing paper spacers between the electrodes. A decided advantage, however, is obtained by the fact that due to the decreased thickness of the resin films as compared with the equivalent paper spacers, the size of units of given capacity is materially reduced.

Aluminum articles coated with a composite film of oxide and thin overlying resin are suitable for any uses requiring a thin tightly adhering protective film.

What I claim as new and desire to secure by Letters Patent of the United States is:

1. An electric capacitor containing cooperating armatures at least one of which consists of aluminum, and an electrolyte, said aluminum armature having provided thereon a current-blocking film of oxide and an electrolyte-permeable resin film coating said current-blocking film.

2. An electric capacitor containing aluminum armatures and an electrolyte, said armatures being provided with a current-blocking film, and a superimposed electrolyte-permeable shellac film.

FRANK M. CLARK.